United States Patent
Ruf et al.

(10) Patent No.: US 8,818,927 B2
(45) Date of Patent: Aug. 26, 2014

(54) METHOD FOR GENERATING RULES AND PARAMETERS FOR ASSESSING RELEVANCE OF INFORMATION DERIVED FROM INTERNET TRAFFIC

(75) Inventors: Thomas Walter Ruf, Fuerth (DE); Bernhard Fischer-Wuenschel, Weihenzell (DE); Renate Wendlik, Roth (DE)

(73) Assignee: GfK Holding Inc., New York, NY (US)

( * ) Notice: Subject to any disclaimer, the term of this patent is extended or adjusted under 35 U.S.C. 154(b) by 254 days.

(21) Appl. No.: 13/157,106

(22) Filed: Jun. 9, 2011

(65) Prior Publication Data

US 2012/0317068 A1  Dec. 13, 2012

(51) Int. Cl.
| | | |
|---|---|---|
| G06F 17/00 | (2006.01) | |
| G06N 5/02 | (2006.01) | |
| G06N 5/04 | (2006.01) | |
| G06Q 10/10 | (2012.01) | |
| G06F 15/173 | (2006.01) | |

(52) U.S. Cl.
CPC ............ *G06N 5/025* (2013.01); *G06N 5/04* (2013.01); *G06Q 10/10* (2013.01)
USPC ............................................. 706/47; 709/224

(58) Field of Classification Search
CPC ......... G06N 5/025; G06N 5/04; G06Q 10/10; H04L 29/08072; H04L 29/06; H04L 43/00
USPC ............................................. 706/47; 709/224
See application file for complete search history.

(56) References Cited

U.S. PATENT DOCUMENTS

| | | | |
|---|---|---|---|
| 6,137,911 A * | 10/2000 | Zhilyaev | 382/225 |
| 7,761,088 B1 | 7/2010 | Hannan et al. | |
| 7,877,611 B2 * | 1/2011 | Camacho et al. | 713/182 |
| 8,055,603 B2 * | 11/2011 | Angell et al. | 706/47 |
| 2002/0016731 A1 | 2/2002 | Kupersmit | |
| 2009/0138427 A1 | 5/2009 | Kalavade | |
| 2009/0138446 A1 | 5/2009 | Kalavade | |
| 2009/0138447 A1 | 5/2009 | Kalavade | |
| 2009/0138593 A1 | 5/2009 | Kalavade | |

(Continued)

OTHER PUBLICATIONS

Erman, Jeffrey, Alexandre Gerber, and Subhabrata Sen. "HTTP in the Home: It is not just about PCs." ACM SIGCOMM Computer Communication Review 41.1 (Jan. 2011): 90-95.*

(Continued)

*Primary Examiner* — Jeffrey A Gaffin
*Assistant Examiner* — James F Sugent
(74) *Attorney, Agent, or Firm* — Brian K Dinicola; Dinicola & Young PC

(57) ABSTRACT

A method is disclosed for generating a set of optimal rules and parameters for use by an evaluation engine on a volume of information extracted from a stream of IP packets associated with a web browsing session conducted over a network in order to filter user-initiated traffic flowing across the network from non-user-initiated traffic. Deep packet inspection is performed to extract the volume of information from the stream that conforms to at least one discrimination criteria. An initial iteration of application of the evaluation engine to the volume is performed by selecting initial discrimination criteria and rules for generating the filtered results and a distance between the filtered results and known actual user-initiated traffic is measured. Subsequent iterations of application of the evaluation engine to the volume are performed by changing the discrimination criteria and/or rules until there is no significant improvement in the measured distance.

18 Claims, 10 Drawing Sheets

(56) References Cited

U.S. PATENT DOCUMENTS

| | | |
|---|---|---|
| 2009/0298480 A1 | 12/2009 | Khambete et al. |
| 2010/0043072 A1 | 2/2010 | Rothwell |
| 2011/0208862 A1 | 8/2011 | Maffione et al. |
| 2011/0255688 A1 | 10/2011 | Spalink et al. |
| 2011/0270971 A1 | 11/2011 | Abraham et al. |
| 2011/0276394 A1 | 11/2011 | Chan |
| 2012/0147769 A1 | 6/2012 | Kalavade |
| 2012/0221570 A1 | 8/2012 | Kalavade |

OTHER PUBLICATIONS

Haq, Furqan, and Thomas Kunz. "Simulation vs. emulation: Evaluating mobile ad hoc network routing protocols." Proceedings of the International Workshop on Wireless Ad-hoc Networks (IWWAN 2005). 2005.*

Qiu, Feng, Zhenyu Liu, and Junghoo Cho. "Analysis of user web traffic with a focus on search activities." Proc. International Workshop on the Web and Databases (WebDB). 2005.*

Weinreich, Harald, et al. "Off the beaten tracks: exploring three aspects of web navigation." Proceedings of the 15th international conference on World Wide Web. ACM, 2006.*

Weinreich, Harald, Hartmut Obendorf, and Eelco Herder. "Data cleaning methods for client and proxy logs." (2006).*

Lee, Jeongeun Julie, and Maruti Gupta. "A new traffic model for current user web browsing behavior." Intel Corporation (2007).*

Xiong, Huijun et al "User Assisted Host-Based Detection of Outbound Malware Traffic" Information and Communications Security. Springer Berlin Heidelberg, 2009, pp. 293-310.

Akriditis, P. et al, "Proximity Breeds Danger: Emerging Threats in Metro-area Wireless Networks" (2007), 16 pp.

"Setting HTTP Status Codes" (http://www.apl.jhu.edu/~hall/java/Servlet-Tutorial-Response-Status-Line.html), downloaded from the internet Mar. 12, 2014, 9 pp.

Madory, Douglas: "New Methods of Spoof Detection in 802.11b Wireless Networking" (Jun. 2006), 65 pp.

Stassapolou, Athena et al, "Web Root Detection: A Probabilistic Reasoning Approach" (Feb. 27, 2009) Computer Networks, Elsevier Science Publishers, B.V., Amsterdam, Netherlands, vol. 53, No. 3, pp. 265-278.

Lee, Jeongeun Julie et al., "A New Traffic Model for Current User Web Browsing Behavior", Intel Corp. (2007), 7 pp.

* cited by examiner

US 8,818,927 B2

METHOD FOR GENERATING RULES AND PARAMETERS FOR ASSESSING RELEVANCE OF INFORMATION DERIVED FROM INTERNET TRAFFIC

BACKGROUND

Communication networks provide services and features to users that are increasingly important and relied upon to meet the demand for connectivity to the world at large. Communication networks, whether voice or data, are designed in view of a multitude of variables that must be carefully weighed and balanced in order to provide reliable and cost effective offerings that are often essential to maintain customer satisfaction. Accordingly, being able to analyze network activities and manage information gained from the accurate measurement of network traffic characteristics is generally important to ensure successful network operations.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

A method is disclosed for generating a set of optimal rules and parameters for use by an evaluation engine on a volume of information extracted from a stream of IP (Internet Protocol) packets associated with a web browsing session conducted over a network in order to filter user-initiated traffic flowing across the network from non-user-initiated traffic. Deep packet inspection ("DPI") is performed to extract the volume of information from the stream that conforms to at least one discrimination criteria. An initial iteration of application of the evaluation engine to the volume is performed by selecting initial discrimination criteria and rules for generating the filtered results and a distance between the filtered results, and known actual user-initiated traffic is measured. Subsequent iterations of application of the evaluation engine to the volume are performed by changing the discrimination criteria and/or rules until there is no significant improvement in the measured distance.

In various illustrative examples of the present method, a user engages in the web browsing session utilizing a network access device such as a mobile phone or smartphone in a laboratory environment to access web pages from servers located on the Internet over a mobile communications network using a request-response protocol such as HTTP (HyperText Transfer Protocol) or SIP (Session Initiation Protocol). In the laboratory, the user and device may be observed to ascertain the "true clicks" (i.e., responses from the server that correspond to user-initiated requests) and "false clicks" (i.e., responses that correspond to non-user-initiated requests such as those implemented through embedded scripts) that are made during the web browsing session. Discrimination criteria such as technical data, page information, or timing-based information are observed by a DPI machine to generate a volume of test data. The rules may include deterministic rules and rules implementing aggregative evaluation of the discrimination criteria (which can be weighted differently). Generation of an evaluation engine may be iterated so that discrimination criteria and rules are applied to the volume of test data in various combinations until filtered results having a maximum number of true clicks and a minimum number of false clicks are obtained.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DESCRIPTION OF THE DRAWINGS

Like reference numerals indicate like elements in the drawings. Unless otherwise indicated, elements are not drawn to scale.

DETAILED DESCRIPTION

Figure 1:
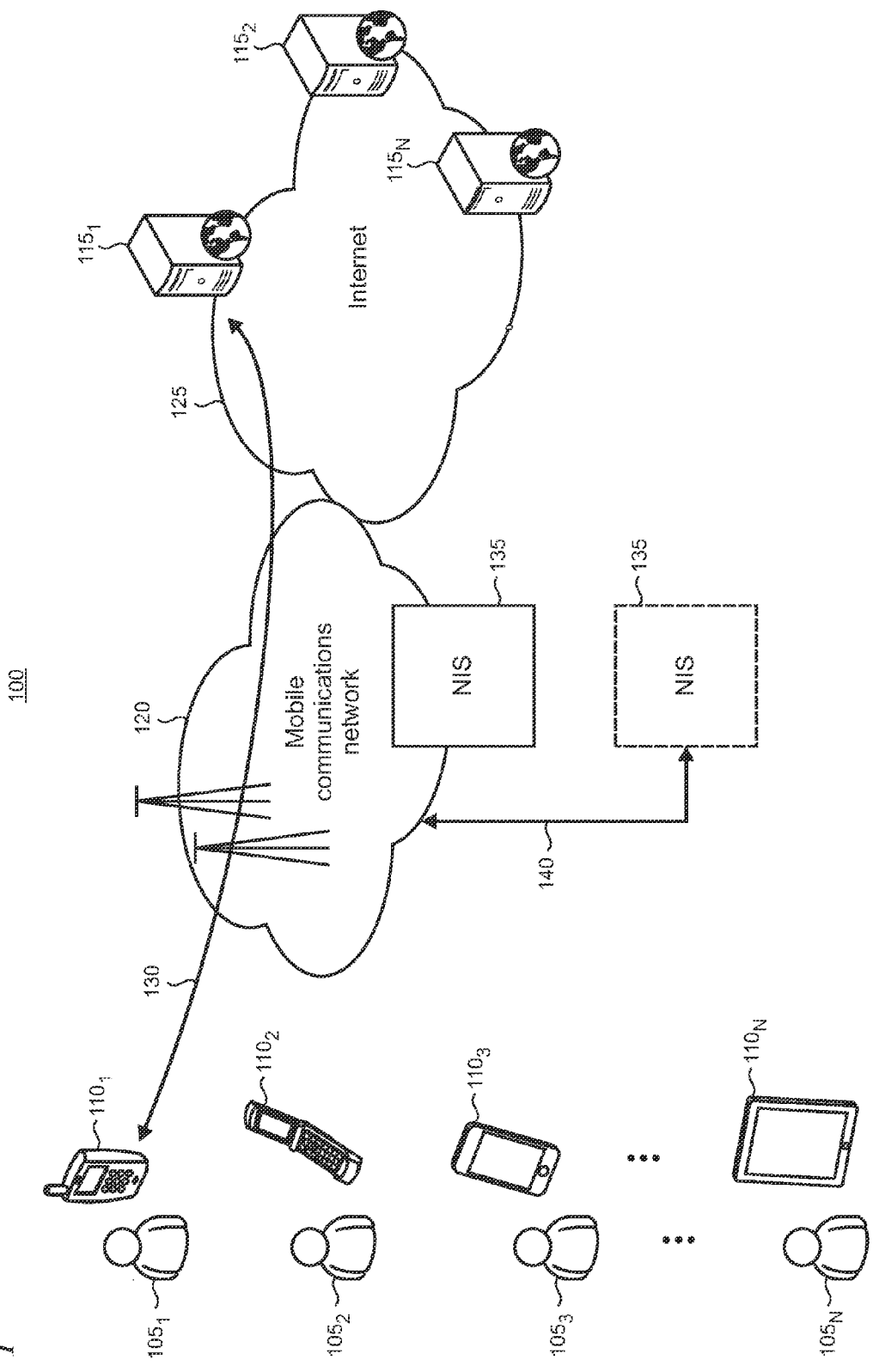
FIG. 1 shows an illustrative mobile communication network environment in which a set of optimal rules and parameters applied by an evaluation engine may be utilized.

FIG. 1 shows an illustrative mobile communication network environment 100 in which a set of optimal rules and parameters applied by an evaluation engine may be utilized. It is recognized that effective analysis of network traffic can provide benefits to both network operators and users of the network (i.e., customers) by enabling, for example, the appropriate resources to be invested to ensure optimal utilization of the network's capacity and effective congestion control, while delivering reliable and high quality service and a rich feature set to the network user. In addition, analysis of users' behaviors when accessing resources such as web pages over the network can help network providers, resource hosts, or third parties to tailor services, products, or other offerings that are responsive to the network users' wants and expectations.

As shown in FIG. 1, a number of users $105_{1, 2 \ldots N}$ of respective network access devices $110_{1, 2 \ldots N}$ may access resources provided from various web servers $115_{1, 2 \ldots N}$. Access is implemented, in this illustrative example, via a mobile communications network 120 that is operatively connected to the web servers 115 via the Internet 125. It is emphasized that the present method is not necessarily limited in applicability to mobile communications network implementations and that other network types that facilitate access to the World Wide Web including local area and wide area networks, PSTNs (Public Switched Telephone Network), and the like that may incorporate both wired and wireless infrastructure may be utilized in some implementations. In this illustrative example, the mobile communications network 120 may be arranged using one of a variety of alternative networking standards such as UMTS (Universal Mobile Telecommunications System), GSM/EDGE (Global System for Mobile Communications/Enhanced Data rates for GSM Evolution), CDMA (Code Division Multiple Access), CDMA2000, or other 2G, 3G, or 4G ($2^{nd}$, $3^{rd}$, and $4^{th}$ generation, respectively) wireless standards, and the like.

The network access devices 110 may include any of a variety of conventional electronic devices or information appliances that are typically portable and battery-operated and which may facilitate communications using voice and data. For example, the network access devices 110 can include mobile phones, e-mail appliances, smartphones, PDAs (personal digital assistants), ultra-mobile PCs (personal computers), tablet devices, tablet PCs, handheld game devices, digital media players, digital cameras including still and video cameras, GPSs (global positioning systems) navigation devices, pagers, or devices which combine one or more of the features of such devices. Typically, the network access devices 110 will include various capabilities such as the provisioning of a user interface that enables a user 105 to access the Internet 125 and browse and selectively interact with web pages that are served by the Web servers 115, as representatively indicated by reference numeral 130.

A network intelligence solution ("NIS") 135 is also provided in the environment 100 and operatively coupled to the mobile communications network 120, or to a network node thereof (not shown) in order to access traffic that flows through the network or node and utilize an evaluation engine that may apply the optimal rules and parameters generated using the present method. In alternative implementations, the NIS 135 can be located remotely from the mobile communications network 120 and be operatively coupled to the network, or network node, using a communications link 140 over which a remote access protocol is implemented.

It is noted that performing network traffic analysis from a network-centric viewpoint can be particularly advantageous in many scenarios. For example, attempting to collect information at the client network access devices 110 can be problematic because such devices are often configured to utilize thin client applications and typically feature streamlined capabilities such as reduced processing power, memory, and storage compared to other devices that are commonly used for web browsing such as PCs. In addition, collecting data at the network advantageously enables data to be aggregated across a number of network access devices 110, and further reduces intrusiveness and the potential for violation of personal privacy that could result from the installation of monitoring software at the client. The NIS 135 is described in more detail in the text accompanying FIG. 4 below.

Figure 2:
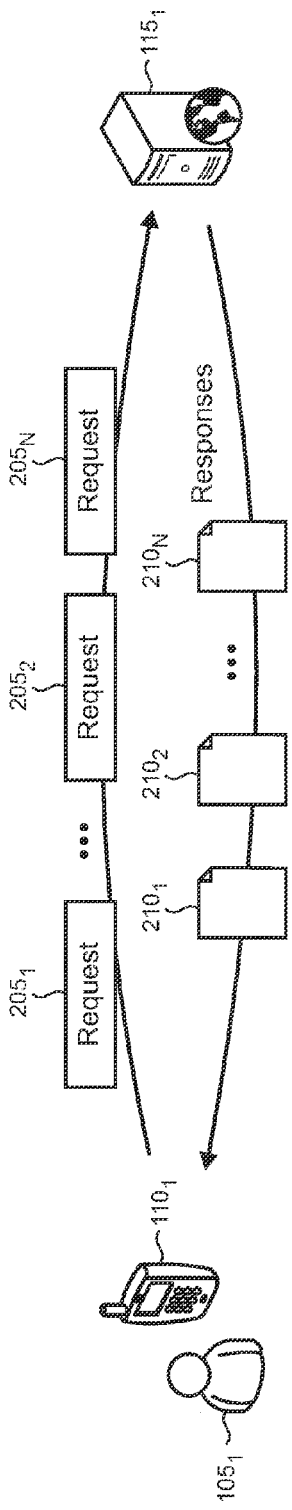
FIG. 2 shows an illustrative web browsing session which utilizes a request-response communication protocol.

FIG. 2 shows an illustrative web browsing session which utilizes a protocol such as HTTP or SIP. In this particular illustrative example, the web browsing session utilizes HTTP which is commonly referred to as a request-response protocol that is typically utilized to transfer Web files. Each transfer consists of file requests $205_{1, 2 \ldots N}$ for pages or objects from a browser application executing on the network access device 110 to a server 115 and corresponding responses $210_{1, 2 \ldots N}$ from the server. Thus, at a high level, the user 105 interacts with a browser to request, for example, a URL (Uniform Resource Locator) to identify a site of interest, then the browser requests the page from the server 115. When receiving the page, the browser parses it to find all of the component objects such as images, sounds, scripts, etc., and then makes requests to download these objects from the server 115.

Figure 3:
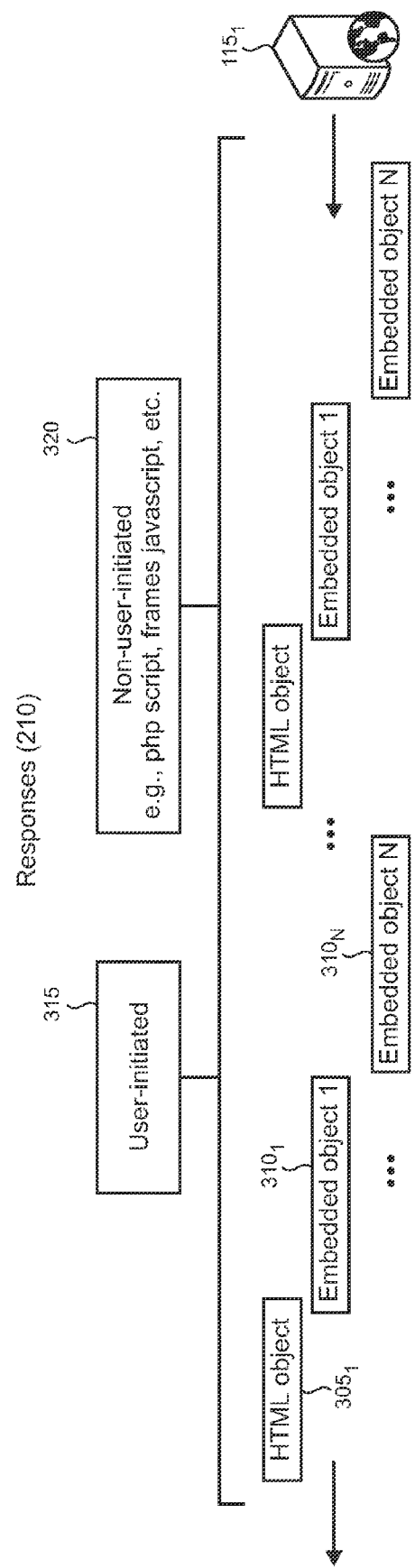
FIG. 3 shows how responses can be both user-initiated and non-user-initiated and include HTML (HyperText Markup Language) objects and embedded objects.

As shown in FIG. 3, a webpage is primarily an HTML (HyperText Markup Language) object (representatively indicated by reference numeral 305) typically having a content type of text/html with links to other objects $310_{1 \ldots N}$ in it as embedded objects (images, sounds, scripts, etc.). A webpage may accordingly be generated either in response to a direct user-initiated request (also termed a "true click"), as indicated by reference numeral 315, or due to a non-user-initiated request (also termed a "false click"), as indicated by reference numeral 320 via execution, for example, of an embedded script at the client network access device 110. Such script execution can result in a substantial amount of network traffic to be automatically generated and to flow to the network access device 110 through the mobile communications network 120. For example, a visit at the news site CNN.com with 5 page views will create 650 HTTP events in which 100 of them are HTML.

Figure 4:
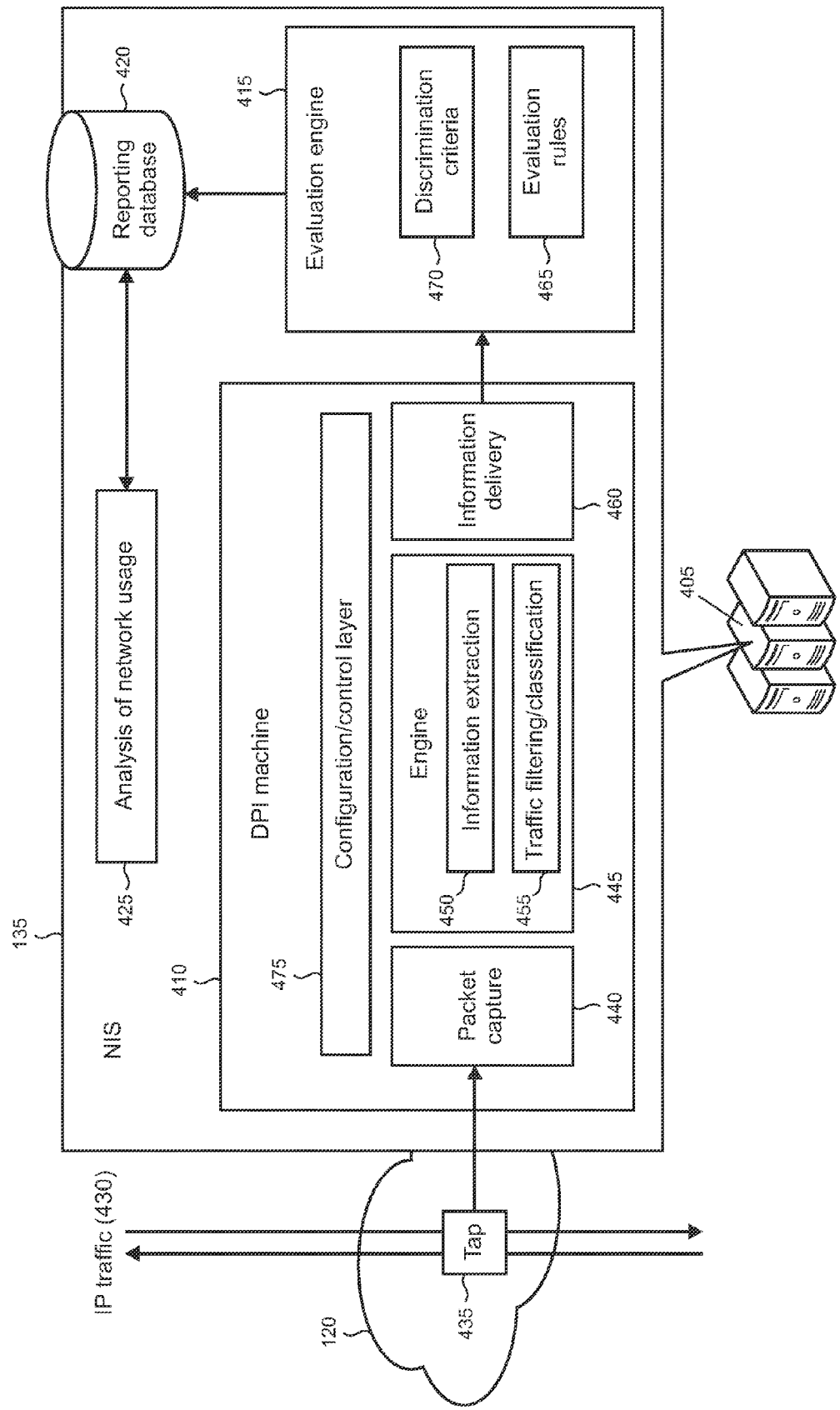
FIG. 4 shows an illustrative network NIS that may be located in a mobile communications network or node thereof.

FIG. 4 shows details of the NIS 135 which is arranged, in this illustrative example, to identify user-initiated traffic and distinguish it from non-user-initiated traffic by examining network traffic through the mobile communications network 120. The NIS 135 is typically configured as one or more software applications or code sets that are operative on a computing platform such as a server 405 or distributed computing system. In alternative implementations, the NIS 135 can be arranged using hardware and/or firmware, or various combinations of hardware, firmware, or software as may be needed to meet the requirements of a particular usage scenario.

The NIS 135 comprises a deep packet inspection ("DPI") machine 410 and an evaluation engine 415 that writes to a database 420. The database 420 may be accessed, manipulated, and queried to perform analysis of the usage of the mobile communications network 120, as indicated by reference numeral 425 in FIG. 4. DPI machines are known, and commercially available examples include the ixMachine produced by Qosmos SA.

As shown, traffic typically in the form of IP packets 430 flowing through the mobile communications network 120, or a node of the network, are captured via a tap 435 in a packet capture component 440 of the DPI machine 410. An engine 445 takes the captured IP packets to extract various types of information, as indicated by reference numeral 450, and filter and/or classify the IP traffic 430, as indicated by reference numeral 455. An information delivery component 460 of the DPI machine 410 then outputs the data generated by the DPI engine 445 to the evaluation engine 415, as shown. The evaluation engine 415 uses various evaluation rules 465 through the application of one or more of the discrimination criteria 470 in various combinations in order to identify user-initiated traffic in the IP traffic 430.

Figure 5:
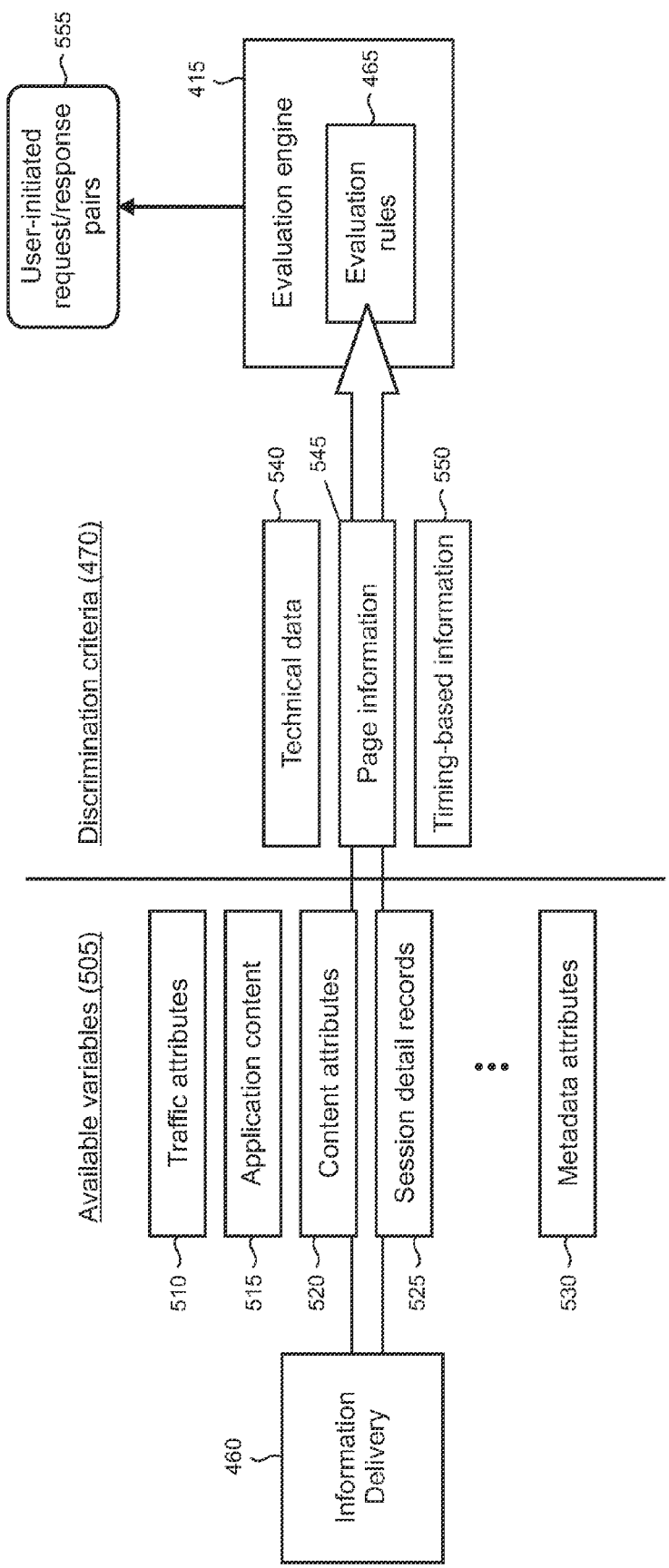
FIG. 5 shows an illustrative set of variables that may be output from a deep packet inspection machine and the selection of a subset therein that are utilized as discrimination criteria in the present method.

FIG. 5 shows an illustrative set of variables 505 that may be output from the DPI machine 410 (FIG. 4) and the selection of a subset therein that are utilized as discrimination criteria 470 in the present method. As shown, the DPI machine 410 has the capability to produce a very large set of variables that can be captured from the IP traffic 430 (FIG. 4). These variables illustratively include traffic attributes 510, application content 515, content attributes 520, session detail records ("SDRs") 525, and metadata attributes 530 among other variables. In accordance with the principles of the present method for generating optimal rules and parameters, it is noted that a particular subset of the myriad of available variables 505 is particularly well-suited for use as discrimination criteria 470. This includes technical data 540, page information 545, and timing-based information 550 which are then applied using the rules 465 by the evaluation engine 415 to identify user-initiated request/response pairs 555.

The selection of the technical data 540, page information 545, and timing-based information 550 may be implemented, for example, by executing the appropriate code in the DPI machine. Turning again to FIG. 4, for example, software code may execute in a configuration and control layer 475 in the DPI machine 410 to select the discrimination criteria from among the variables that are available for output by the engine 445 in the DPI machine 410.

Figure 6:
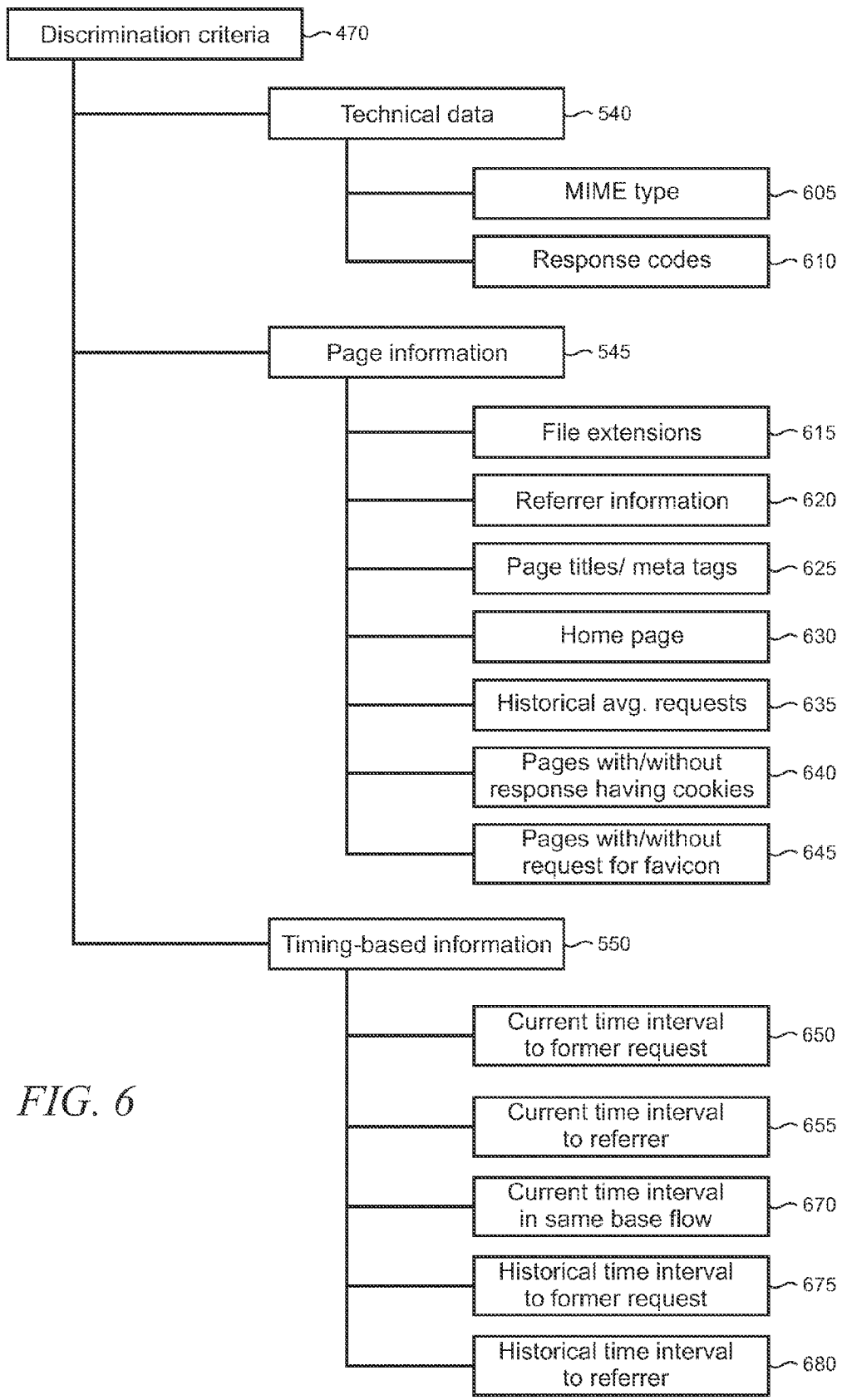
FIG. 6 shows an illustrative taxonomy of discrimination criteria that may be utilized in the present method for generating the rules and parameters.

FIG. 6 shows an illustrative taxonomy 600 of discrimination criteria 470 that may be applied by the rules 465 (FIG. 4) in the evaluation engine 415. It is emphasized that the taxonomy 600 is intended to be illustrative of the variables that have been determined to be good candidates to identify user-initiated request/response pairs in many typical applications. However, the variables illustrated in taxonomy 600 should not be viewed as an exhaustive listing of all suitable variables. As shown, the technical data 540 illustratively includes MIME (Multipurpose Internet Mail Extension) type 605 such as text/html, image/jpeg, application/x-javascript, xhtml+xml, and the like. The technical data 540 further includes response codes 610 (i.e., status codes) from a Web server 115 where, for example, response codes 200-299 indicate OK, codes 301-304 indicate redirection, and codes 400-999 indicate errors.

The page information 545 illustratively includes file extensions 615 such as .jpg, .bmp, .gif, .htm, .js, etc. Referrer information 620 may include web pages without a referrer (i.e., where a referrer identifies, from the point of view of a webpage, the address or URL of the resource which links to it). The page information 545 may further include page titles and meta-tags 625 where the meta-tags may include, for example, search words, and also include a URI (Uniform Resource Identifier) to a home page 630. Page information 545 may further include an historical average number of requests 635 that are received at a particular server 115. Variables included in the page information 545 also include pages both with and without a response having cookies (including third-party cookies), as indicated by reference numeral 640, and pages both with and without a request for a favorite icon (also termed a "favicon"), as indicated by reference numeral 645.

The timing-based information 550 illustratively includes the time interval between a current request (e.g., request 205 in FIG. 2) to a former (i.e., preceding) request, as indicated by reference numeral 650. The timing-based information 550 may also include the time interval between a current request and a referrer, as indicated by reference numeral 655.

Under the HTTP 1.1 standard, multiple successive requests may be written out to a single network socket without waiting for a corresponding response from the remote server in a process known as "pipelining." The requestor (e.g., the browser) then waits for the responses to arrive in the order in which they were requested. The pipelining of requests can result in a significant improvement in page loading times, especially over high latency connections. The time interval between a current request and a request in the same base flow when using the pipelining technique, as indicated by reference numeral 670 may also be included in the timing-based information 550. The timing-based information 550 may further include observations of the history of the time intervals between requests 675, as well as the historical time interval to a referrer 680.

Figure 7:
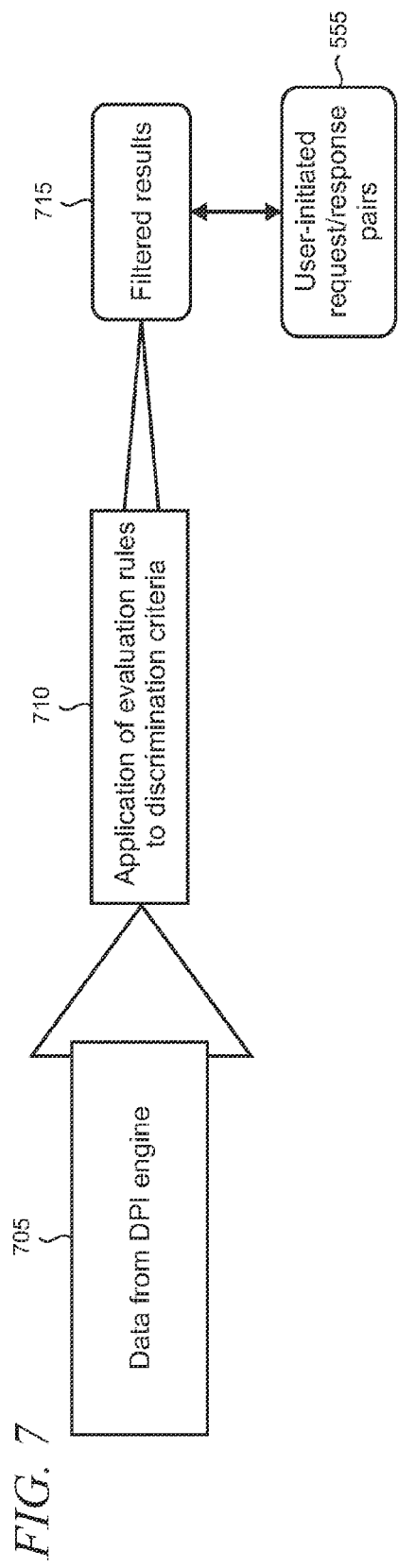
FIG. 7 shows an illustrative data flow from the deep packet inspection machine through an evaluation engine to produce filtered results which may be used to identify network access device user activities.

As noted above, the evaluation rules 465 used by the engine 415 (FIG. 4) are applied to the network traffic using the discrimination criteria 470 in order to identify user-initiated requests and corresponding server responses and further distinguish those requests/responses from non-user-initiated responses that may be generated, for example, through execution of embedded scripts. In other words, as shown in FIG. 7, data 705 generated from the DPI engine 445 (FIG. 4) is filtered through the application of the evaluation rules to the discrimination criteria, as indicated at reference numeral 710, to produce a set of filtered results 715. The optimal target of such filtering would be a one-to-one correspondence between the filtered results 715 and the user-initiated responses.

Figure 8:
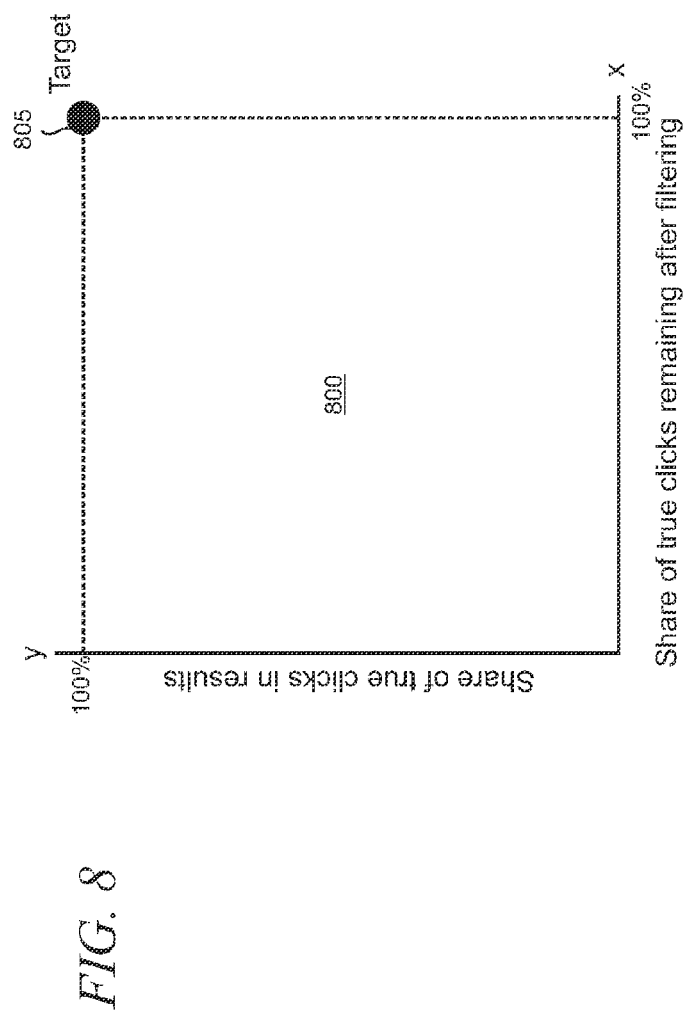
FIG. 8 shows a chart depicting an ideal target for the filtered results in which the x-axis represents the share of "true clicks" remaining after filtering and the y-axis represents the share of "true clicks" in the results.

FIG. 8 depicts a chart 800 which expresses this target graphically in which the x-axis indicates the share of true clicks remaining after filtering and the y-axis represents the share of true clicks in the filtered results. The target 805 is at 100% on the x-axis and 100% on the y-axis which means that no true clicks are missed (i.e. the filtered results 715 are not under-inclusive of true clicks) and only true clicks are included (i.e., the filtered results are not over-inclusive to include false clicks).

Figure 9:
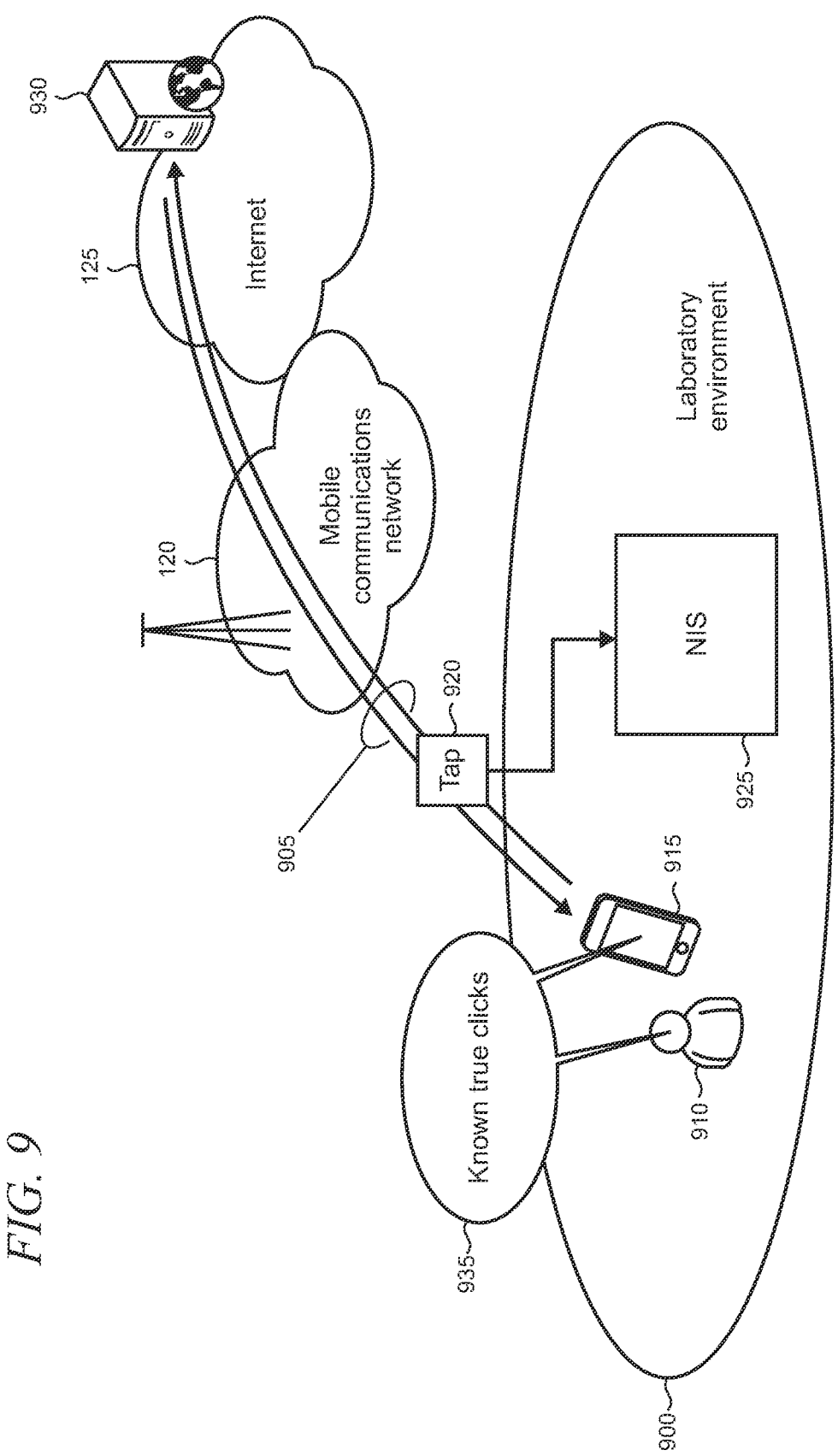
FIG. 9 shows an illustrative laboratory environment in which known true clicks associated with a web browsing session may be obtained to generate the present rules and parameters.

The evaluation engine 415 can be applied to a volume of test data that may be obtained under controlled conditions, for example, in a laboratory environment 900 as shown in FIG. 9. In the laboratory environment 900, IP packets 905 associated with a web browsing session of a known individual user 910 and network access device 915 may be tapped via a tap 920 by an NIS 925 that is co-located in the laboratory or otherwise provided with remote access to it. The NIS 925 can be arranged in a similar manner to the NIS 135 shown in FIGS. 1 and 4 and described in the accompanying text.

As shown in FIG. 9, the network access device 915 may access one or more known servers, as representatively indicated by reference numeral 930, via the mobile communications network 120 and the Internet 125. However, in some implementations, characteristics of the mobile communications network 120 and the Internet 125 can be simulated in the laboratory environment. Alternatively, other types of networks such as local area networks or virtual private networks may be desirably utilized.

During the web browsing session in the laboratory environment 900, observations of the user 910 and/or the network access device 915 may be made in order to obtain a set of known true clicks 935 that may be used to define parameters associated with the ideal target 805 shown in FIG. 8. In some cases, information describing the behaviors and actions of the known server 930, such as code that executes on the server 930, may be optionally utilized to further enhance definition of the target 805, or for other purposes in the laboratory.

In one illustrative example of data collection in the laboratory environment 900, several volumes of test data were generated for web browsing sessions on several websites with many page views. Utilization of a DPI machine created a large amount of request and response objects showing the timing of the request and response, the URL/URI of the referrer, the MIME type, and the response code. Additional information was added to the objects for test purposes including the true click information, page titles, and meta tags.

In the laboratory environment 900 various evaluation rules and discrimination criteria may be tested alone or in different combinations to generate filtered results from the volume of test data that can be compared against the set of known true clicks 935 to assess whether a given evaluation engine applying such rules and criteria provides results that are acceptably close to the target 805. The evaluation rules may encompass a range of rules and include relatively straightforward deterministic rules as well as more complex rules that utilize, for example, the aggregation of evaluations of a plurality of discrimination criteria (i.e., variables), where the evaluations can be weighted differently. The aggregation may be performed, for example, on an additive or multiplicative basis.

Figure 10:
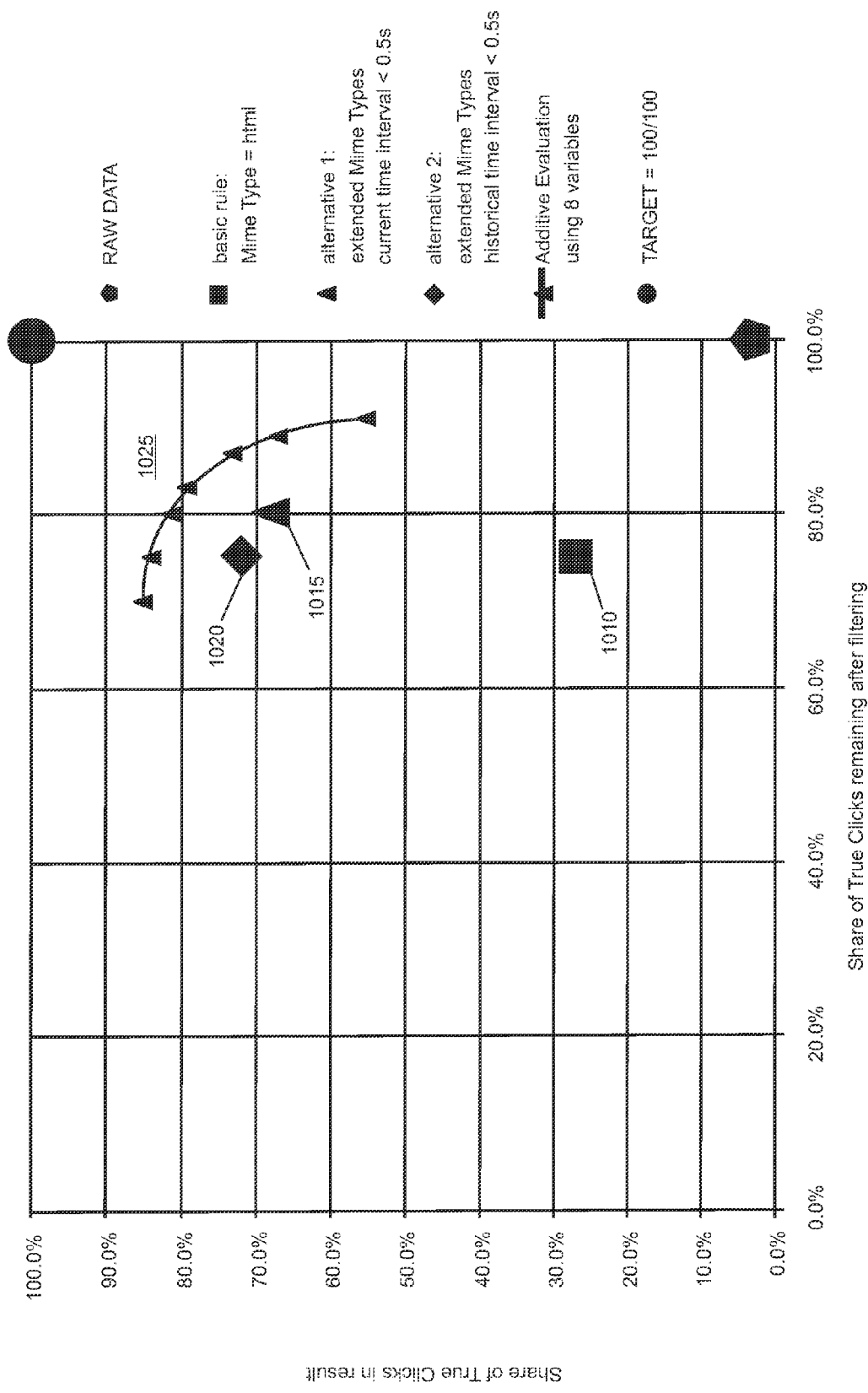
FIG. 10 shows a chart depicting filtered results from the application of an evaluation engine using several different criteria.

An example of application of an illustrative basic deterministic rule set is one that includes a response in the filtered results if the MIME type=text/html, and the response code=2xx (i.e., indicating that the corresponding request was successfully received, understood, and accepted), while excluding responses with file extensions like .jpg, .bmp, .gif, .js, and the like. When applied in an evaluation engine on the volume of test data having known true clicks, the performance of the engine is fairly poor with 25% of true clicks missed from the filtered results and many false clicks included, yielding a result of 75% on the x-axis and 28% on the y-axis, as indicated by the symbol 1010 in FIG. 10.

An illustrative first alternative deterministic rule set using current time intervals can be utilized by an evaluation engine as follows: the application of rule 1 results in the inclusion of an object in a response in the filtered results if the object is determined to belong to a group MIME type=text/html (or a comparable group such as xhtlm, xml, plain/text, etc.). Rule 2 includes a response object in the results when a server response code=2xx. Rule 3 excludes an object having a particular file extension such as .jpg, .bmp, .gif, .js, and the like. Rule 4 excludes an object if the time interval to a former request is less than 0.5 seconds. Application of this first alternative rule set to the volume of test data yields 20% of true clicks missed from the filtered results and comparably fewer false clicks included for a result of 80% on the x-axis and 68% on the y-axis as indicated by the symbol 1015 in FIG. 10.

An illustrative second alternative deterministic rule set using historical time intervals can also be utilized by an evaluation engine as follows: Rules 1-3 are the same as in above example. Rule 4 excludes an object from the results if the historical time interval to a former request was, in 70% of the cases, less than 0.5 seconds. Application of this second alternative rule set to the volume of test data yields 25% of true clicks missed from the filtered results and comparably fewer false clicks included for a result of 75% on the x-axis and 72% on the y-axis as indicated by the symbol 1020 in FIG. 10.

An example of a more complex rule set illustratively includes an evaluation of an object based on the aggregative evaluation of several discrimination criteria. This rule set relies upon the observation that some MIME types and file extensions are more likely to be associated with user-initiated actions, others are less likely, and some are definitely not associated. In addition, objects without a referrer and objects that are referrers for other objects are more likely to be associated with user-initiated actions. And, objects that appear with a high time interval or show a historically high median time interval are more likely to be associated with user-initiated actions. Here, each subjective weighting is applied (and expressed as points) to the set of eight discrimination criteria below:

+10 if MIME type=text/html; +5 if MIME type=xml; −50 if MIME type=jpg, gig, bmp, etc.

+5 if home page (i.e., HTTP URL path=/)
+5 if a current time interval to former request is above 0.5 sec or +10 if above 2 sec.
+5 if an historical time interval to a former request is on average above 0.5 sec or +10 if above 2 sec.
−10 if the current time interval in the same base flow is below 0.1 sec.
+3 if an object has no referrer and/or is the object is a referrer of other events.
+3 if the object has a title or meta tags
+1 if the object requests cookies and/or favorite icons This rule set enables calculation of the consequences of specific threshold values. It is observed that an increase of the threshold value will increase the exclusion rate of false clicks, but also increases the probability of excluding true clicks. Application of this complex rule set to the volume of test data yields results that vary between 91/55 (percentages on the respective x-axis and y-axis) and 70/85 depending on the particular threshold values selected, as shown by symbols 1025 in FIG. 10. The aggregation of values may be changed in several ways, for example, by adding or replacing criteria, changing the weights of a single criterion, or by changing the method of aggregation. Accordingly, the complex rule set can be further refined using the additive aggregation expression:

$$p = \sum_{i=1}^{n} b_i * v_i$$

where p is the probability that an object is associated with a true click, V is the variable discrimination criterion, and b is the weight. Multiplicative aggregation may be alternatively implemented in some cases according to:

$$p = \prod_{i=1}^{n} v_i^{b_i}$$

Figure 11:
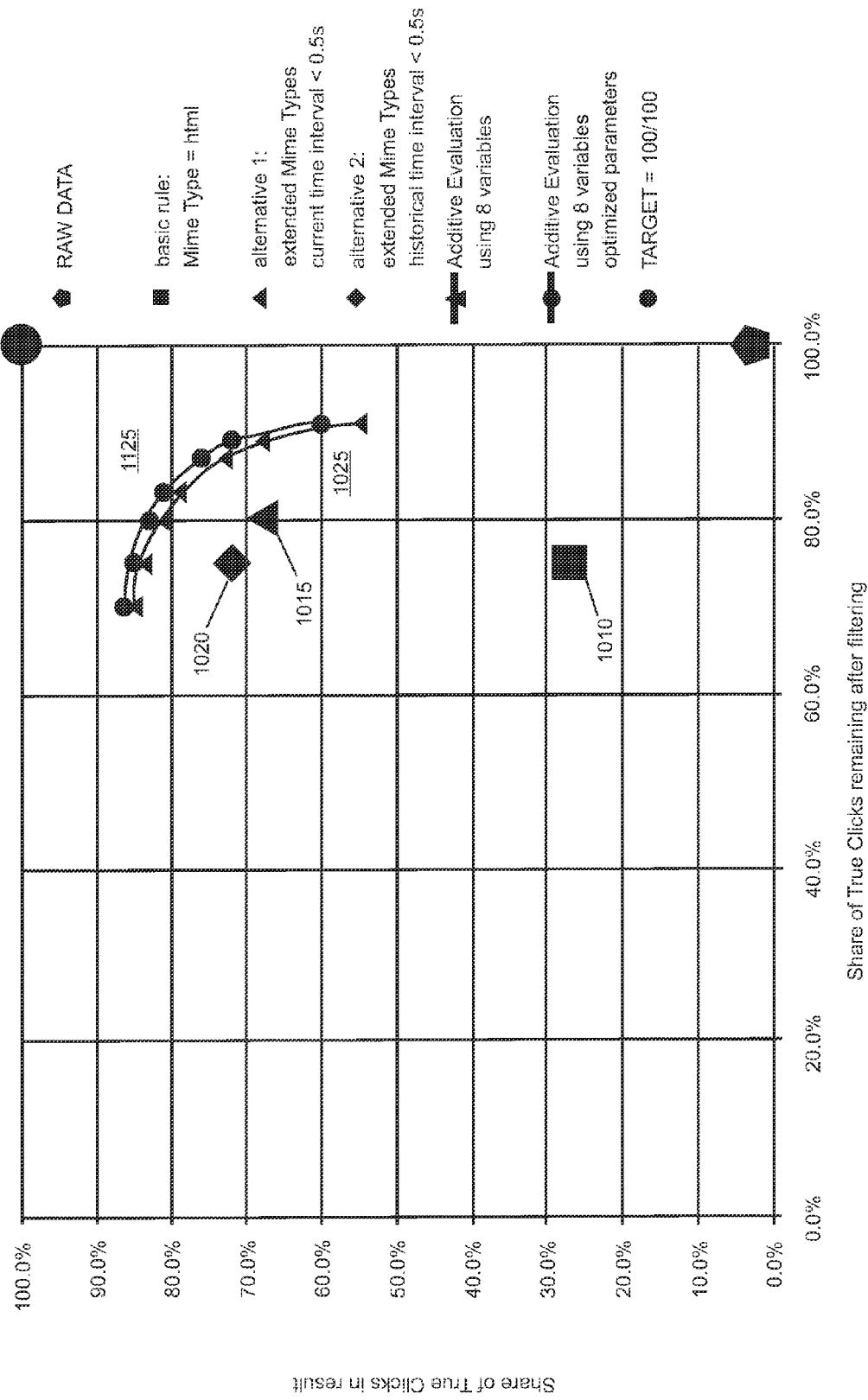
FIG. 11 shows a chart depicting filtered results from the application of an evaluation engine that uses optimal weighting of a selected set of discrimination criteria.

When using the additive aggregation expression, optimized weights for the eight discrimination criteria listed above can be calculated for a basic data set using standard dummy regression. Application of an evaluation engine using the optimized weights demonstrates improved filtering performance for various threshold values as shown by the symbols 1125 in FIG. 11.

Figure 12:
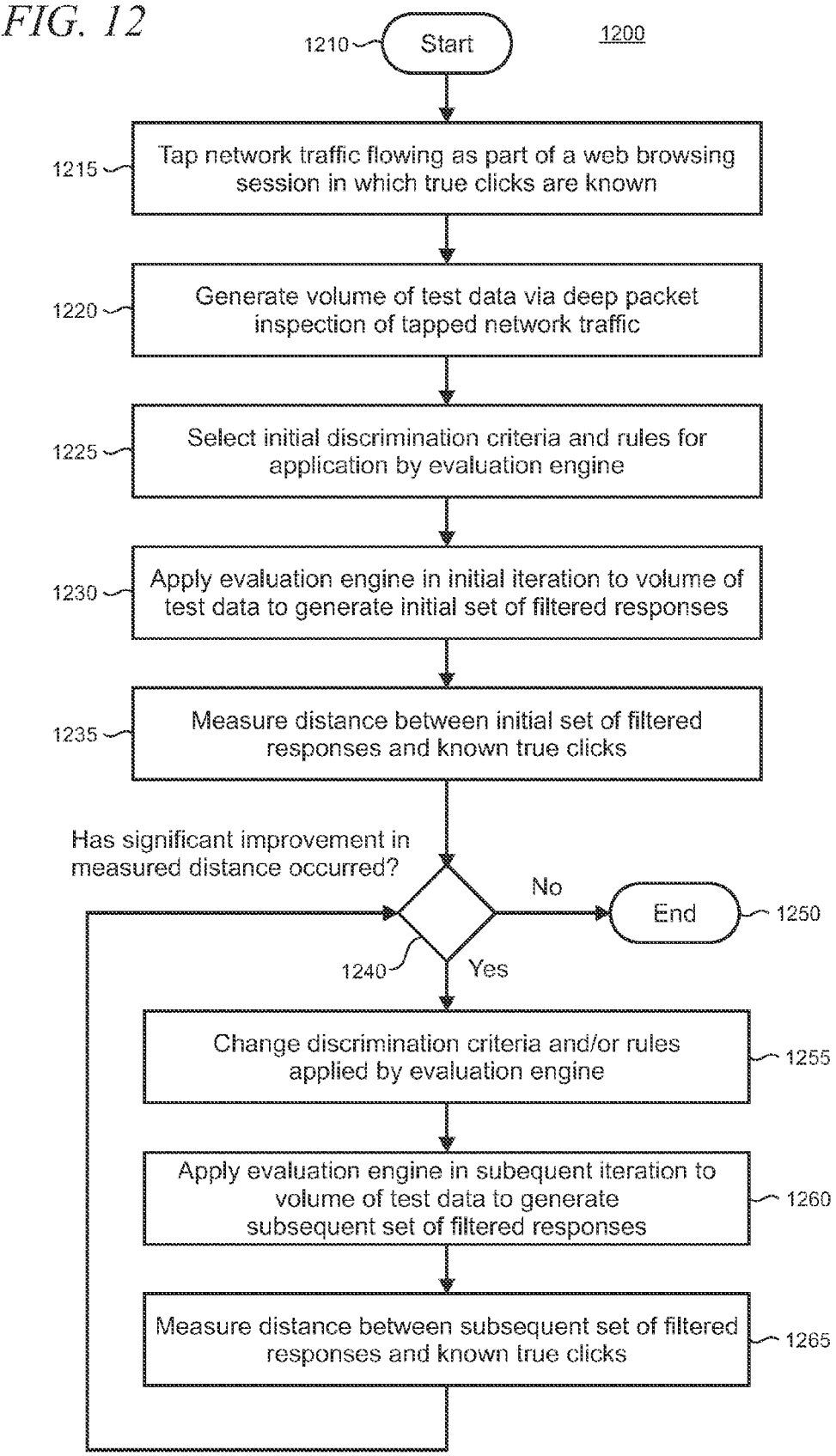
FIG. 12 shows a flowchart of an illustrative method for generating a set of optimal rules and parameters for use by an evaluation engine.

FIG. 12 shows a flowchart of an illustrative method 1200 for generating a set of optimal rules and parameters for use by an evaluation engine. The method begins at block 1210. At block 1215, traffic flowing as part of a web browsing session is tapped to collect IP packets. As noted above, such collection can typically take place in a laboratory environment where conditions are controlled and the user is known so that true clicks can be directly observed. This laboratory environment can be expected to differ from the field environment in which the evaluation engine utilized in the method 1200 is deployed where the users 105 can typically be expected to be members of the public who are customers of the mobile communications network.

In such a field environment, the data collected and utilized by the NIS 135 (FIGS. 1 and 4), or portions thereof can be anonymized to remove identifying information from the data, for example, to ensure that privacy of the network access device users is maintained. Other techniques may also be optionally utilized in some implementations to further enhance privacy including, for example, providing notification to the users 105 that certain anonymized data may be collected and utilized to enhance network performance or improve the variety of features and services that may be offered to users in the future, and providing an opportunity to opt out (or opt in) to participation in the collection.

Anonymization may be implemented by encrypting portions or all of the tapped network traffic to obscure information from which the network access device users' identities or data that could be used to obtain their identities might otherwise be determined. In some cases, the encrypted data may include a unique "anonymizing" identifier that can be correlated to unencrypted traffic data extracted from those packets associated with a corresponding user 105. This anonymizing process allows mobile communications network use of any individual user to be differentiated from the network use of all other users on a completely anonymous basis—that is, without referencing any personal identity information (e.g., name, address, telephone number, account number, etc.) of the user.

A volume of test data is generated via deep packet inspection of the tapped network traffic at block 1220 in FIG. 12. An initial iteration of application of an evaluation engine is performed, at block 1225, by selecting initial discrimination criteria and rules. At block 1230, the initial iteration of application of the evaluation engine to a volume of test data is performed to generate an initial set of filtered responses. At block 1235, a measurement of the distance between the initial set of filtered responses and known actual user-initiated traffic (i.e., known true clicks) is performed. Decision block 1240 is skipped after the initial set of filtered responses is generated and control passes to block 1255.

At block 1255, the discrimination criteria and/or rules applied by the evaluation engine are changed. The evaluation engine is applied, in a subsequent iteration, to a volume of test data to generate a subsequent set of filtered responses at block 1260. At block 1265, a measurement is made of the distance between the subsequent set of filtered responses and the known user-initiated traffic (i.e., known true clicks). Control is passed to decision block 1240 where a determination is made to continue to iterate the method steps 1255, 1260, and 1265 or end the method 1200. If no significant improvement in the measured distance has occurred, then the method 1200 ends at block 1250.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method comprising the steps of:
receiving a sample volume of information requests originating at a network access device for processing in accordance with a request/response protocol;
recording an indication of whether each information request of the sample volume was invoked by action of a network access device user or by a prior information request;
examining the response to each received information request of the sample volume to identify its file type;
storing an indication of the file type of the response to each received information request of the sample volume;
applying an evaluation engine using at least one initial criterion to thereby establish an initial boundary between those information requests invoked by an action of a network access device user and those information requests invoked by a prior information request;
classifying each information request of the sample volume as invoked by action of a network access device user or by a prior information request on the basis of whether or not the at least one criterion is satisfied;
measuring a distance between a number of information requests classified as being invoked by the user and an actual number of information requests invoked by the user;
measuring an overall ratio of information requests classified as being invoked by the user to an overall number of information requests before and after modifying the at least one initial criterion applied by the evaluation engine; and
repeating the classifying and modifying steps so as to progress toward a one-to-one correspondence between a number of information requests classified as invoked by the user and the actual number of information requests invoked by the user.

2. The method of claim 1 in which the information request is an hypertext transfer protocol (http) request.

3. The method of claim 1 in which the at least one criterion includes a requirement that the file type specified by a response to an information request have a text/html, xhtml, xml, or plain/text extension.

4. The method of claim 1 further including a step of recording a response code within the response to each information request of the sample volume.

5. The method of claim 4 in which the at least one criterion includes a requirement that a respective response code associated with a corresponding information request be 2xx to thereby indicate the corresponding information request was received, understood and accepted.

6. The method of claim 1 in which the at least one criterion includes a requirement that the file type specified by an information request not have a jpg, bmp, gif, or gs extension.

7. The method of claim 1 further including a step of tracking time differences between information requests or sequences of requests from a network access device user.

8. The method of claim 1 further including a step of tracking time differences between an information request and a response to an information request or a sequence of requests from a network access device user.

9. The method of claim 1 further including a step of tracking historical time differences between information requests having at least one shared characteristic in sequences of requests from at least one network access device user.

10. The method of claim 9 in which the at least one shared characteristic includes the Multipurpose Internet Mail Extensions (MIME) type or Uniform Resource Identifier (URI) path.

11. One or more non-transitory computer-readable storage media containing instructions which, when executed by one or more processors disposed in an electronic device, perform a method for applying an evaluation engine, the method comprising the steps of:
generating a volume of test data associated with a web browsing session conducted at least in part over a communications network between a network access device and a remote server by applying one or more discrimination criteria to a stream of IP packets associated with the web browsing session;
ascertaining known true clicks and known false clicks associated with the volume of test data by observing the behavior of the network access device or a user of the network access device during the web browsing session;
using an evaluation engine that includes one or more deterministic rules or one or more evaluative rules that are applied to the volume of test data to generate a set of filtered results comprising modeled true clicks;

measuring a distance between the modeled true clicks from the evaluation engine and the known true clicks;

comparing the modeled true clicks in the set of filtered results to the known true clicks to evaluate performance of the evaluation engine;

modifying the evaluation engine by changing the discrimination criteria or the rules responsively to the comparing; and repeating the modifying step so as to progress toward a one-to-one correspondence between the modeled true clicks and the known true clicks.

12. The one or more non-transitory computer-readable storage media of claim 1 in which the improvement comprises maximizing a number of objects in the filtered results which correspond to known true clicks and minimizing a number of objects in the filtered results which correspond to known false clicks.

13. The one or more non-transitory computer-readable storage media of claim 11 in which the ascertaining is performed in a laboratory environment.

14. The one or more non-transitory computer-readable storage media of claim 11 in which the generating of the volume of test data utilizes a deep packet inspection (DPI) machine.

15. A computer-implemented method for applying an evaluation engine for distinguishing between true clicks and false clicks in a web browsing session between a network access device and a remote server, the method comprising the steps of:

configuring a network intelligence solution with access to a stream of Internet Protocol (IP) packets utilized in the web browsing session so that the network intelligence solution may tap at least a portion of the IP packets;

applying deep packet inspection to the tapped IP packets to extract selected information from the IP packets according to discrimination criteria, the discrimination criteria including at least one of technical data, page information, or timing-based information;

applying an evaluation engine incorporating rules arranged for filtering the extracted information to include modeled true clicks and exclude modeled false clicks, the rules being deterministic or implementing aggregative evaluation of each of the discrimination criteria;

comparing a result of application of the evaluation engine to the extracted information against known true clicks that a observed to occur during the web browsing session, modifying the evaluation engine by changing the discrimination criteria or the rules responsively to the comparing; and repeating the modifying step so as to progress toward a one-to-one correspondence between the modeled true clicks and the known true clicks.

16. The computer-implemented method of claim 15 in which the aggregative evaluation is additive or multiplicative.

17. The computer-implemented method of claim 15 in which the aggregative evaluation uses weighting of the discrimination criteria.

18. The computer-implemented method of claim 17 further including a step of optimizing the weighting using standard dummy regression.

* * * * *